F. A. NIEBERDING & E. V. COULSTON.
GAS RANGE.
APPLICATION FILED MAY 17, 1912.

1,047,435.

Patented Dec. 17, 1912.
4 SHEETS—SHEET 1.

ATTEST

INVENTORS
Frank A. Nieberding
Earl V. Coulston
BY
Fisher & Albert
ATTYS.

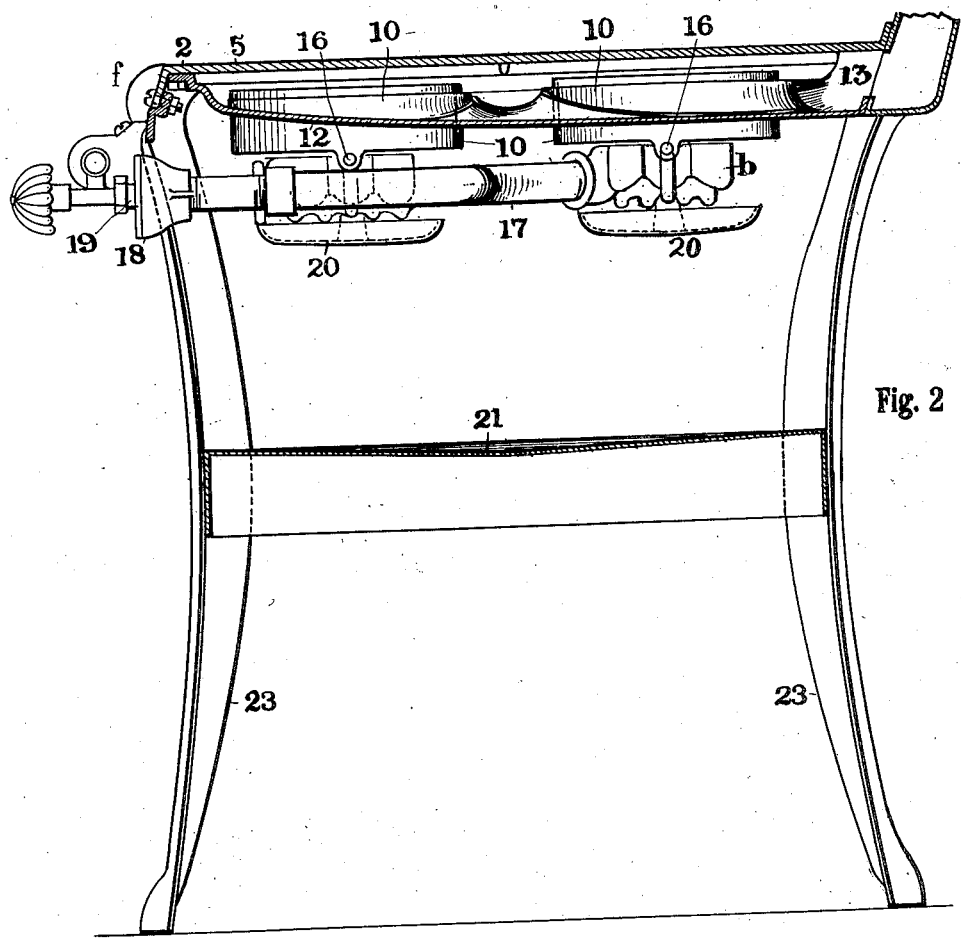
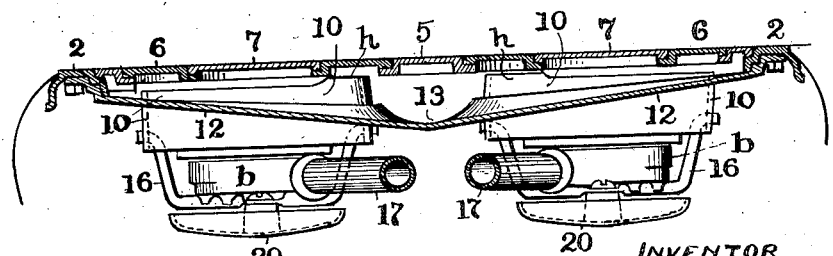

F. A. NIEBERDING & E. V. COULSTON.
GAS RANGE.
APPLICATION FILED MAY 17, 1912.

1,047,435.

Patented Dec. 17, 1912.
4 SHEETS—SHEET 3.

ATTEST
E. M. Fisher
F. C. Museum.

INVENTOR
Frank A. Nieberding
Earl V. Coulston
BY Fisher & Moore ATTYS.

UNITED STATES PATENT OFFICE.

FRANK A. NIEBERDING AND EARL V. COULSTON, OF CLEVELAND, OHIO, ASSIGNORS TO THE ECONOMY STOVE COMPANY, OF CLEVELAND, OHIO, A CORPORATION.

GAS-RANGE.

1,047,435.    Specification of Letters Patent.    Patented Dec. 17, 1912.

Application filed May 17, 1912. Serial No. 697,871.

*To all whom it may concern:*

Be it known that we, FRANK A. NIEBERDING and EARL V. COULSTON, citizens of the United States, residing at Cleveland, in the county of Cuyahoga and State of Ohio, have invented certain new and useful Improvements in Gas-Ranges, of which the following is a specification.

This invention relates to gas ranges, and the invention consists in a range or stove of a four-hole size in this instance possessing certain novel and original features of construction which relate said holes to each other and to a common exhaust or outlet for the waste products of combustion, thus insuring the healthful and sanitary character of the range in the apartment, all substantially as shown and described and particularly pointed out in the claims.

Figure 1:
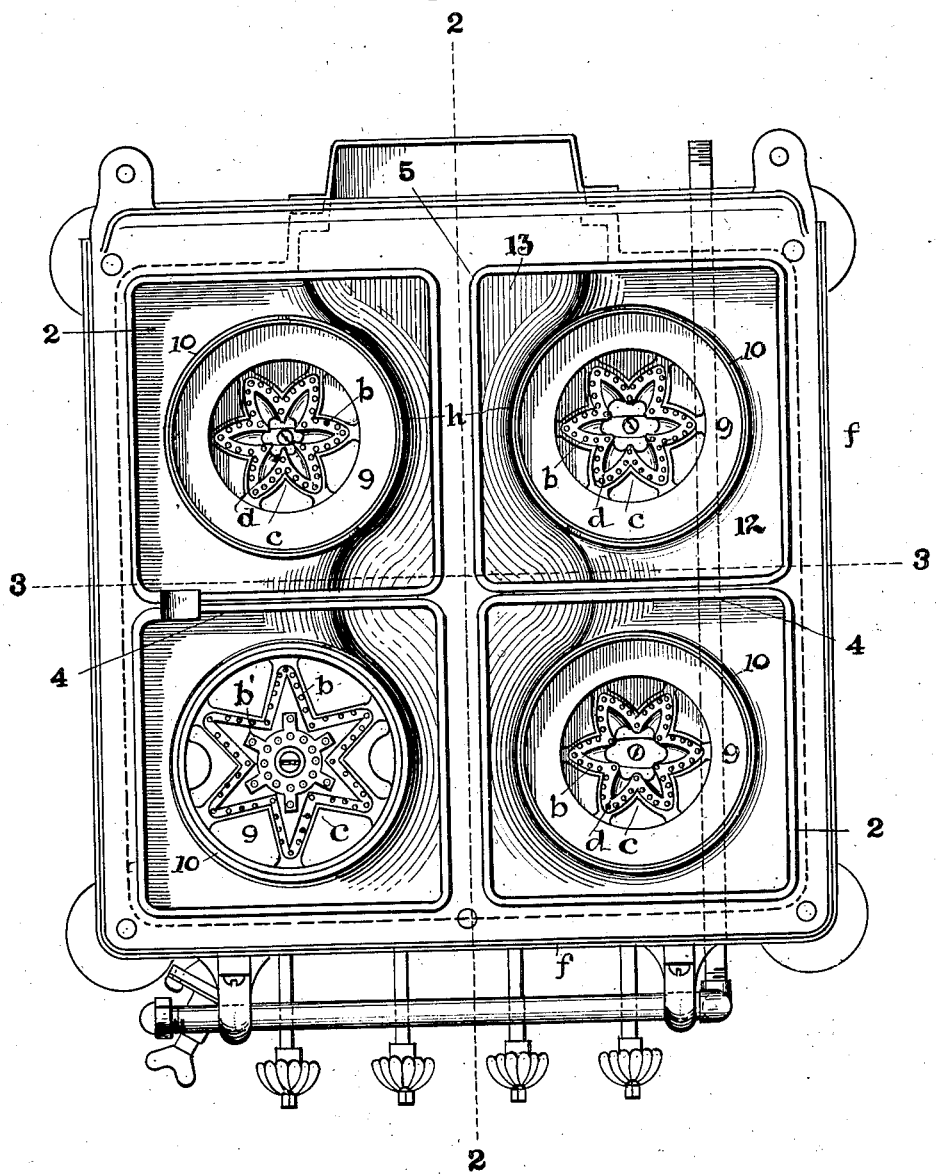
Figure 4:
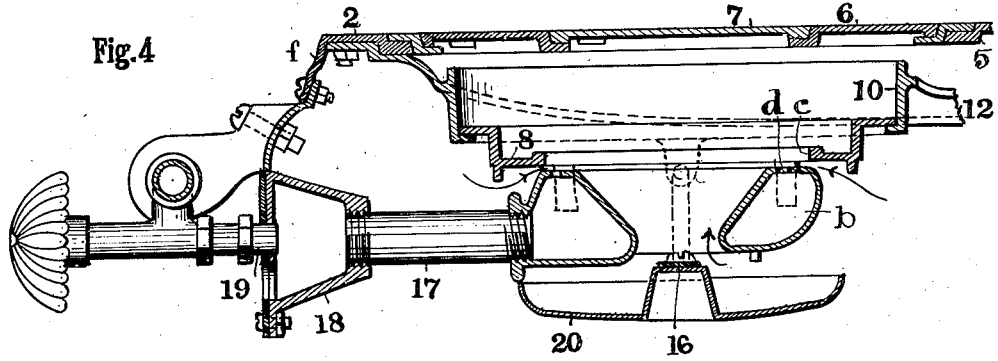
Figure 5:
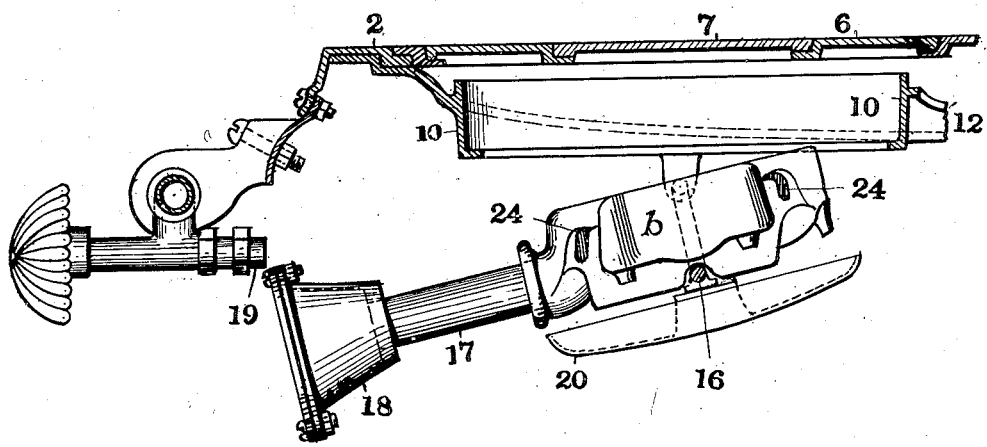
Figure 6:
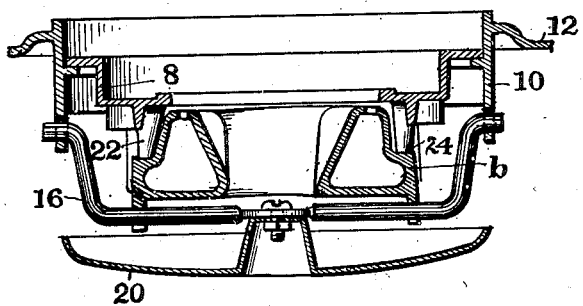
Figure 7:
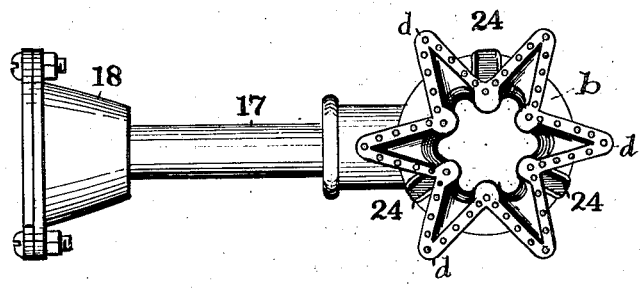
Figure 8:
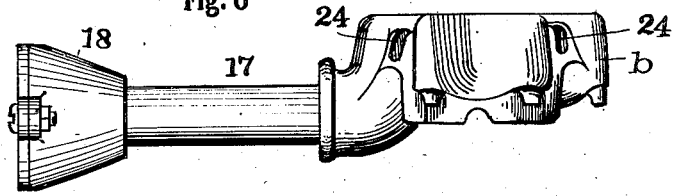
Figure 9:
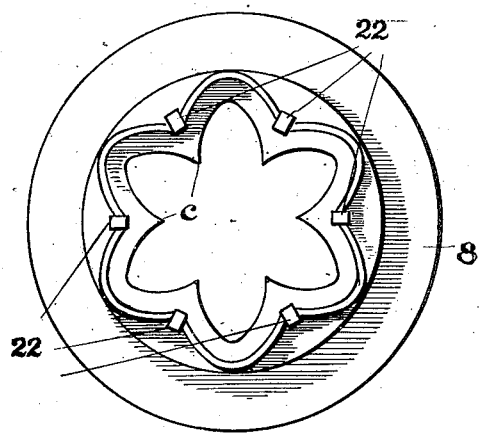
Figure 10:
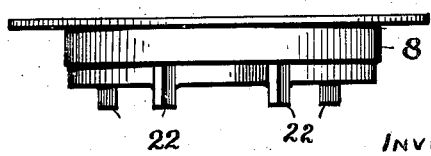

In the accompanying drawings, Figure 1 is a plan view of the range with the lids removed and showing the burners. Fig. 2 is a central sectional elevation front to rear, on line 2—2, Fig. 1. Fig. 3 is a sectional elevation substantially on line 3—3, Fig. 1, and designed more especially to show the bottom plate or housing for the burners as will hereinafter more clearly appear. Fig. 4 is a sectional elevation, enlarged, as compared with Fig. 3, of one of the burners and the parts associated therewith. Fig. 5 is a view like Fig. 4 except that the burner is tilted as occurs when it is being removed or replaced. Fig. 6 is a cross section of one of the burners and associated parts and showing particularly its means of support. Fig. 7 is a plan view of one of the burners with its supply pipe and mixer, and Fig. 8 is a side elevation thereof. Fig. 9 is a bottom view of one of the burner centering and regulating rings and Fig. 10 is a side elevation thereof.

The range as thus shown belongs essentially to the class of gas ranges as such in contradistinction to what may be termed combination ranges of more or less diversified manufacture but which are adapted to burn solid and gaseous fuel interchangeably and are provided with exhaust flues to chimneys to carry away the waste products of combustion from both kinds of fuel. This latter construction of ranges also has the usual oven beneath and the stove top provided with lids and with an escape for the waste between them; but our present invention is a totally different conception from any and all of such ranges known to us and appertains exclusively to a gas range as such and particularly to a style or variety of range which has no oven or other operating features beneath the top burners shown herein and indicated by $b$. An oven or other attachment may be made over the rear of the range, as usually is done, but no part of the present invention being contained in such attachment it is omitted from the drawings. Now, approaching the details of construction more especially, we have, first, the stove or range top or top plate 2 which covers the entire top of the range and has a border or flange $f$ about its front and sides and square or rectangular openings or holes corresponding to the four several burners and spaced apart by the cross bars 4 and the front to rear bar 5 of the said top forming parts of the seats for the plates 6 which occupy said holes flush with the top of the stove. The said plates have each a central round hole corresponding to the usual holes in the tops of stoves for kettles and lids and which receive the lids 7 in this case. One of the front holes is shown as larger in this range than the three others to accommodate what may be termed a double burner $b'$, but all the holes and burners may be alike and no further notice need be taken of this difference. The several plates 6 are removably seated in the top plate 2 but presumably are not disturbed except as it becomes necessary to open the top of the stove more freely to remove a burner or for other unusual reason. Furthermore, the stove is intended to be used with the lids 7 in place after the manner of a coal stove, so that there is no escape of offensive and poisonous fumes into the room as always occurs with the more common kind of gas ranges which have no exhaust flues and discharge everything directly into the room. The burners $b$ are therefore so located in respect to the openings above and the lids thereon that suitable space is allowed for the flame beneath said lids, say approximately two inches in a full sized construction.

Each burner is provided with a centering and air regulating ring 8, which is shaped to conform to the outlines of the burner itself in its inner portion and to the collar 10 in its outer portion. The said ring has a flat flange about its top which fits closely at its edge in the surrounding collar 10 and which is an integral portion of the bottom plate 12 of the combustion chamber, of which the top plate 2 and the lids and plates thereon form the top or cover and the plate 12 the bottom. The said bottom plate is preferably a cast metal part and unevenly shaped as to its upper surface to get the desired effects or results in combustion and in the exhaust of the foul products. Thus, the said plate is formed with more or less depression over its entire surface as compared with its straight flat edges which are firmly bolted to the top plate 2 and make a close connection therewith, as seen in Figs. 3 and
4. From the said edges the plate gradually drops more or less toward its middle on all lines except at its center and rear where an exit 13 is provided for the spent gases and something of a trough-like formation leads centrally to said exit from the front to insure a sustained draft which will carry the said gases away and supply a sufficient air draft for the burners. However, the lines of depression vary more or less about the respective collars 10, as also seen measurably in Fig. 3, and the said collars rise more or less above the bottom plate 12 according to their location front or rear and their relation to the central draft channel. It may be observed here that the portions of these collars which come above the bottom 12 have to do very materially with equalizing the flame effects of the burners, it being obvious that since the deepest and most direct draft to the exit 13 is along the center front to rear the tendency to draw excessively upon the flame along this line will be correspondingly increased and hence the precaution of providing a higher flange $h$ toward the center until at the rear they nearly touch the lid. Precaution must therefore be taken to equalize the flame and avoid unequal drafts in each burner individually both front and rear.
The burners $b$ are supported exclusively upon the stirrups 16, which are suspended from opposite holes in the bottoms of the collars 10, and have pipe connections 17 which carry the mixers 18 at their front ends and which are hung loosely on the fixed gas supply stub or nipple 19. It follows from this construction that in case it becomes necessary to remove a burner it can be swung back on its stirrup support and downward at front, Fig. 5, and be bodily lifted out by any unskilled person and as easily replaced. A drip pan 20 is fixed beneath each burner on the stirrup 16 and a drip plate 21 overlies the bottom beneath all the burners and is affixed to the legs 23 at its corners. The said centering rings 8 have inside substantially V-shaped spurs $c$ horizontally disposed and relatively occupying the space between the spurs $d$ of the burner and slightly overlapping the same and apart therefrom relatively as seen in Fig. 4, so that a suitable supply of air may be provided for the burner from about the outside thereof while there is also a limited opening for air up through its center. Legs or projections 22 are formed on the bottom of the several spurs $c$ of the said rings which seat in recesses 24 in the side of the burner and support the ring apart from the top and outer edge thereof just far enough to permit the inflow of air to sustain combustion as above described but yet near enough to avoid the effects of air currents.

Now, from the foregoing, it will be seen that the only air which is admitted at all into the combustion chamber or space between the closed top of the range and the bottom plate 12 is such as enters through or immediately about the burners between the centering rings 8 and the perforated spurs of the burners, and that the space above the burners is safeguarded especially by the collars 10 in such way as to both exclude stray air currents from beneath and to prevent uneven draft from about the tops of the burners. Furthermore, all the foul and unhealthful products of combustion go off through the exit 13, and if it should happen, as sometimes it does, that a burner is left open more or less without ignition the escaping gas will pass off into the chimney and not be discharged into the room.

The inner edge of the star-shaped opening in ring 8 follows closely the line of gas perforations in the burner $b$, and as the space between the spurs $c$ and $d$ is relatively small, only a thin sheet of air is permitted to pass; but, each perforation thereby receives a direct and predetermined supply of air from the outside to promote combustion.
All the air that enters the heating or combustion chamber housed in by bottom plate 12 and the cover plate or plates of the stove must pass over and through the burners $b$, which are otherwise openly exposed beneath bottom plate 12.

What we claim is:

1. A gas range having top and bottom plates secured together at their edges and the lower plate depressed between its edges to form a chamber and having openings with vertically disposed collars about the same and said collars extending both above and below said plate in varying degrees according to the position they occupy in said chamber, in combination with burners relatively beneath said collars and an outlet for the products of combustion at the rear of the range between said plates.

2. A gas range having a chamber with openings in its bottom and burners therein, a ring conforming to the shape of each burner having guide projections at its bottom engaging the said burner and collars supporting said rings slightly apart from the edge of the burner to admit air from beneath.

3. A gas range having a combustion chamber closed over its top and at its front and sides and having an exhaust opening in its rear and burner openings in its bottom, in combination with burners supported beneath said openings, rings conforming to the shape of said burners and adapted to limit the inflow of air thereto, and collars in said burner openings centering and confining said rings.

4. A gas range having a combustion chamber with burner openings in its bottom and closed about its front and sides to the admission of air, collars fixed in said openings, swinging stirrups suspended from said collars and burners supported on said stirrups.

5. A gas range having a combustion chamber with openings in its bottom provided with collars, stirrups suspended from said collars and burners supported on said stirrups, and air controlling rings supported upon said burners and centered in the said collars.

6. A gas range having a combustion chamber common to all the burners therein and having a depression centrally front to rear forming an exhaust channel for the products of combustion, openings in the bottom of said chamber having collars extending above the surface thereof and relatively of greater depth as said channel is approached and thereby preventing excessive draft in the burner next to said channel.

7. A gas range having a chamber closed over its top and having a bottom plate provided with openings having substantially band shaped collars about the same, burners relatively beneath said collars and means suspending the burners therefrom, and rings about the upper portions of said burners supported by said collars and adapted to limit the inflow of air to the burners.

8. A gas range having top and bottom plates closed about their edges and forming a chamber between them, the said chamber having an exit for the products of combustion and the said bottom plate provided with openings for burners and an undulating surface about said burners and integral collars about said openings projecting both above and below said plate, in combination with burners relatively beneath said openings and yokes suspending the burners from said collars.

9. A gas range having independent burners provided each with a gas supply pipe at its front and a mixer on the end of said pipe, a plate having openings with collars about the same, swinging stirrups supporting said burners in said openings from said collars and fixed gas supply nipples on which said mixers are engaged.

In testimony whereof we affix our signatures in presence of two witnesses.

FRANK A. NIEBERDING.
EARL V. COULSTON.

Witnesses:
 E. M. FISHER,
 F. C. MUSSUN.